(12) United States Patent
Farnsworth et al.

(10) Patent No.: US 6,928,071 B2
(45) Date of Patent: *Aug. 9, 2005

(54) MECHANISM FOR CONDUCTING IN-BAND COMMUNICATIONS BETWEEN TERMINAL ADAPTER AND DIGITAL TERMINAL DEVICE DURING INTERNET SESSION

(75) Inventors: Kyle A. Farnsworth, Huntsville, AL (US); C. Brian Goodwin, Madison, AL (US); Lin Yow-Chern Chang, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 182 days.

This patent is subject to a terminal disclaimer.

(21) Appl. No.: 10/610,213

(22) Filed: Jun. 30, 2003

(65) Prior Publication Data

US 2004/0008671 A1 Jan. 15, 2004

Related U.S. Application Data

(63) Continuation of application No. 09/483,348, filed on Jan. 14, 2000, now Pat. No. 6,614,803.

(51) Int. Cl.[7] .................................................. H04J 3/22
(52) U.S. Cl. .................... 370/352; 370/395.3; 370/401; 370/465; 709/310; 709/321
(58) Field of Search .............................. 370/328, 338, 370/352, 401, 398, 465–467; 709/218, 222, 226, 310, 321

(56) References Cited

U.S. PATENT DOCUMENTS

| 5,289,579 A | 2/1994 | Punj .......................... 395/200 |
|---|---|---|
| 5,317,630 A | 5/1994 | Feinberg et al. ............... 379/94 |
| 5,598,411 A | 1/1997 | Matsukawa .................. 370/352 |
| 5,612,959 A | 3/1997 | Takase et al. ................ 370/390 |
| 5,745,702 A | 4/1998 | Morozumi ............. 395/200.79 |
| 5,878,040 A | 3/1999 | Peirce, Jr. et al. .......... 370/389 |
| 6,108,330 A | 8/2000 | Bhatia et al. ................ 370/352 |
| 6,115,460 A | 9/2000 | Crowe et al. .......... 379/211.02 |
| 6,278,707 B1 | 8/2001 | MacMillan et al. ......... 370/352 |
| 6,333,931 B1 | 12/2001 | LaPier et al. ................ 370/385 |
| 6,377,554 B1 | 4/2002 | Farnsworth et al. ........ 370/252 |
| 6,445,682 B1 | 9/2002 | Weitz ......................... 370/257 |
| 6,445,695 B1 | 9/2002 | Christie, IV ................ 370/352 |
| 6,614,803 B1 * | 9/2003 | Farnsworth et al. ........ 370/352 |

* cited by examiner

Primary Examiner—Zarni Maung
Assistant Examiner—Van Nguyen
(74) Attorney, Agent, or Firm—Allen, Dyer, Doppelt, Milbrath & Gilchrist, P.A.

(57) ABSTRACT

A communication control mechanism installable in the communications controller of an ISDN terminal adapter is operative to conduct in-band communications with its digital terminal device during an internet communication session between the digital terminal device and a digital communication network interface of an internet service provider. The terminal adapter monitors the data link establishment communication exchange between the network access server and the personal computer, to identify and capture internet protocol addresses for the digital terminal device and the network access interface. These addresses are then used by the terminal adapter to communicate in-band with the digital terminal device using user datagram protocol (UDP)-based messages.

19 Claims, 4 Drawing Sheets

MECHANISM FOR CONDUCTING IN-BAND COMMUNICATIONS BETWEEN TERMINAL ADAPTER AND DIGITAL TERMINAL DEVICE DURING INTERNET SESSION

CROSS REFERENCE TO RELATED APPLICATIONS

This application is a continuation of U.S. patent application Ser. No. 09/483,348, filed Jan. 14, 2000, now U.S. Pat. No. 6,614,803, issued Sep. 2, 2003.

FIELD OF THE INVENTION

The present invention relates in general to digital communication systems, and is particularly directed to a communication control mechanism, which is installable in the communications controller of a terminal adapter, such as that employed for integrated services digital network (ISDN) communications, and which is operative to enable in-band communications to be conducted between the terminal adapter and a digital terminal device coupled thereto, during an internet communication session between the digital terminal device and a network interface of an internet service provider.

BACKGROUND OF THE INVENTION

As diagrammatically illustrated in the reduced complexity network communication diagram of FIG. 1, terminal adapters, such as that shown at 11, enable digital communication signals, such as ISDN signals, to be interfaced between a customer's digital terminal equipment (DTE) 13 and a network access server 15 for a communication network 17, by adapting the network's serial line rate and coding into those of the connected digital communication port of the DTE. In addition to serving as a conduit for digital data communications, which are typically encapsulated by means of point-to-point protocol (PPP) between the DTE 13 and the network server 15, the terminal adapter 11 typically includes additional ports, such as may be employed for analog (POTS) and digital voice (B1/B2) voice channel communications with telephone devices 14.

Although a conventional terminal adapter is typically controllably configurable by the user (either directly through panel switches, or from the DTE), modifying its parameters via the DTE requires that the terminal adapter be off-line. Moreover, where the additional ports of the terminal adapter are being used for other calls during an internet session, the user of the DTE may wish to be provided with information relating to their use (for example by way of a pop-up window)—something that is not currently available in a conventional terminal adapter.

SUMMARY OF THE INVENTION

In accordance with the present invention, this conventional inability to conduct on-line communications between the terminal adapter and the user's DTE is successfully obviated by means of a digital message monitoring mechanism, that is installable in the terminal adapter's communications control processor. Pursuant to the invention, this digital message monitoring mechanism is operative to identify the internet protocol addresses for each of the DTE (personal computer) and the internet service provider's digital communication network interface, as these addresses are negotiated during a data link establishment communication exchange between the digital communication network interface and the DTE.

As noted above, the encapsulation and transportation of higher layer packet protocols, such as internet protocol (IP), over a digital communication link, such as a wide area network link, often employs point-to-point protocol (PPP) between peers. One of these peers is the digital terminal equipment (e.g., personal computer (PC)); the other is the network access server. In the course of establishing a communication (internet) session, PPP options are negotiated as a mechanism for relaying information. The link control protocol (LCP) is negotiated first. For IP packet transfer, IP control protocol (IPCP) must be negotiated after the LCP has reached the open state, and after any authentication has been completed. One of the IPCP options involves assigning or announcing the IP address of each peer.

During IPCP negotiation, the network access server will customarily assign the user's personal computer with an IP address for its TCP/IP stack. Also, the network access server can inform the DTE of its (the server's) IP address. Once a connection or data link has been established between the DTE's terminal adapter and the remote network access server, it is necessary to provide a (logical) port additional to the data port to the DTE for control and status signaling.

In accordance with the invention, the terminal adapter's communication controller monitors the IPCP packets by way of a packet decoder installed in the respective serial transmission paths from the PC to the network access server, and from the network access server to the PC. In the DTE-to-network interface direction, packets are clocked through a serial queue to the PPP packet decoder, the output of which is controllably gated by the communication controller. When a packet is destined for the terminal adapter rather than the network access server, the gate is disabled to prevent the packet from being forwarded to the network access server. In the network interface-to-DTE direction, packets are coupled to the terminal adapter by way of a network interface and clocked through a serial queue to the PPP decoder.

During the IP address negotiation portion of the internet session, the PPP packet decoder examines the contents of the IPCP packets for peer IP address information, that will allow the terminal adapter to communicate in-band with the DTE using user datagram protocol (UDP)-based messages injected into the serial data path to the DTE. In a complementary fashion, the DTE may send UDP-based messages to the terminal adapter. Information in the UDP packets will prompt the communication controller to prevent the packets from being forwarded to the network access server.

The UDP destination (logical) port number may be any random port number, that is predetermined in accordance with the listener task software being run by the DTE. In addition, an IP header created by the terminal adapter contains a source IP address and a destination IP address. The source IP address is the IP address of the network access server and the destination IP address is the IP address of the DTE that were negotiated and stored by the terminal adapter during data link establishment. The listener task routine captures all UDP packets directed to the predetermined port number. The DTE's TCP/IP stack passes status information conveyed in the captured packets to the program for display on a graphic user interface.

DETAILED DESCRIPTION

Figure 1:
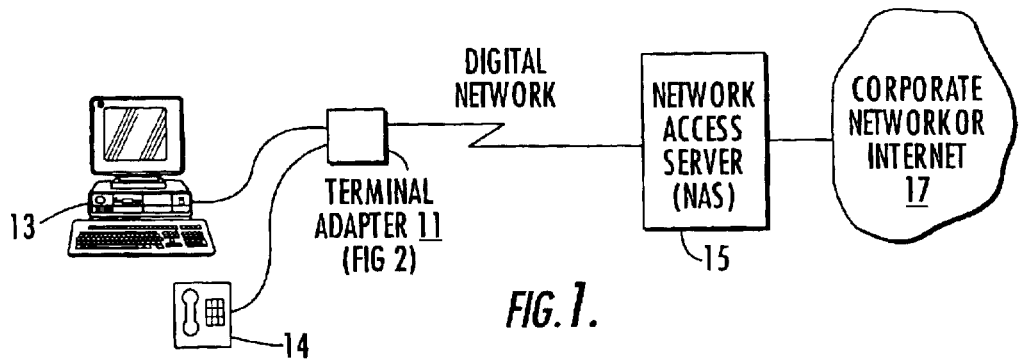
FIG. 1 is a reduced complexity digital network communication diagram showing a terminal adapter interfacing digital terminal equipment with a network access server.

Before describing in detail the new and improved terminal adapter/DTE communication scheme in accordance with the present invention, it should be observed that the invention resides primarily in what is effectively a prescribed arrangement of conventional communication circuits and associated digital signal processing components and attendant supervisory control circuitry therefor, that controls the operations of such circuits and components. As a consequence, the configuration of such circuits components, and the manner in which they are interfaced with other communication network equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of a digital communication network, including the terminal adapter, in a convenient functional grouping, whereby the present invention may be more readily understood.

In addition, for an illustration of non-limiting examples of documentation relating to various digital communication protocols, including those described herein, attention may be directed to the following: "The PPP Internet Protocol (IPCP)," by G. McGregor, RFC 1332, The Internet Society, May 1992; "Internet Protocol," by J. Postel, STD 5, RFC 791, The Internet Society, September, 1981; "User Datagram Protocol," by J. Postel, STD 6, RFC 768, The Internet Society, August, 1980; "The Point-to-Point Protocol (PPP)," W. Simpson editor, STD 51, RFC 1661, The Internet Society, July 1994; and "Assigned Numbers," by J. Reynolds et al, STD 2, RFC 1700, The Internet Society, October 1994, (see also http:www.iana.org/numbers.html).

As described briefly above, a commonly employed method of encapsulating and transporting higher layer packet protocols, such as internet protocol (IP), over a digital communication link, such as a wide area network link, is to use point-to-point protocol (PPP) between peers. One of these peers is the digital terminal equipment (e.g., personal computer (PC)), shown at 13 in FIG. 1, referenced above; the other is the network access server. In the course of establishing a communication (internet) session, these peers negotiate PPP options as a mechanism for relaying information therebetween.

The link control protocol is negotiated first. For IP packet transfer, IP control protocol (IPCP) must be negotiated after the LCP has reached the open state, and after any authentication has been completed. One of the IPCP options involves assigning the IP address of a peer. During IPCP negotiation, the network access server 15 will customarily assign the user's DTE 13 with an IP address for its TCP/IP stack. Also, the network access server 15 can use the same option to inform the DTE 13 of its (the server's) IP address. Once a connection or data link has been established between the DTE's terminal adapter and the remote network access server, it is necessary to provide a (logical) port additional to the data port to the DTE for control and status signaling.

Figure 2:
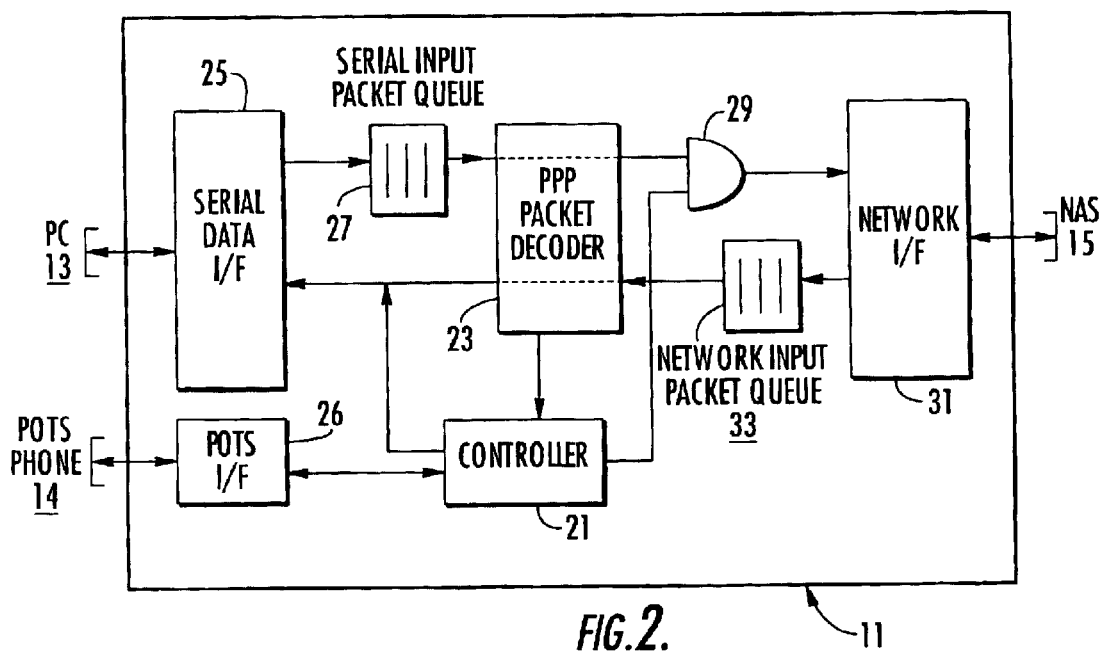
FIG. 2 diagrammatically illustrates a terminal adapter containing the packet monitoring and UDP-based communications control mechanism in accordance with the invention.

For this purpose, as shown in the terminal adapter diagram of FIG. 2, in accordance with the present invention, the terminal adapter's communication controller 21 is coupled to monitor the IPCP packets by way of a PPP packet decoder 23 installed in the respective serial transmission paths from the DTE or personal computer (PC) to the network access server, and from the network access server to the DTE. Controller is also coupled via a POTS interface 26 to (POTS) telephone device 14.

In the DTE-to-network interface direction, packets from the DTE 13 are coupled to the terminal adapter by way of a serial data interface 25 and serially clocked through a first-in, first-out (FIFO) packet queue or register 27. The output of the FIFO 27 is coupled through PPP packet decoder 23 to an AND gate 29, which is controllably enabled/disabled by the communication controller. As will be described, AND gate 29 is disabled and thereby prevents a packet sourced from the DTE 13 from being forwarded via the network interface 31 to the network access server 15, when that packet is destined for the terminal adapter rather than the network access server. In the network interface-to-DTE direction, packets from the network access interface 15 are coupled to the terminal adapter by way of a network interface 31 and serially clocked through a first-in, first-out (FIFO) packet queue or register 33 to the PPP decoder 23.

During the IP address negotiation portion of the internet session, to be described below with reference to the state diagram of FIG. 4, the PPP packet decoder 23 examines the contents of the IPCP packets for peer IP address information, that will allow the terminal adapter to communicate in-band with the DTE. Given knowledge of each peer's IP address, the communication controller 21 is then able to conduct in-band communications for exchanging control/status messages with the DTE 13 during an active internet session. It does this by 'spoofing' the DTE's listener task software into thinking that such in-band messages, which employ user datagram protocol (UDP), are associated with the network access server when, in reality, they are sourced from the terminal adapter.

UDP protocol based messages sourced from the terminal adapter's communication controller 21 are injected into the serial data path to the DTE 13 through the serial data interface 25. In a complementary manner, the DTE 13 may send UDP-based messages to the terminal adapter. In this case, information in the UDP packets monitored by the PPP packet decoder 23 will prompt the communication controller 23 to disable the AND gate 29 and thereby prevent these packets from being forwarded via the network interface 31 to the network access server 15.

Figure 3:
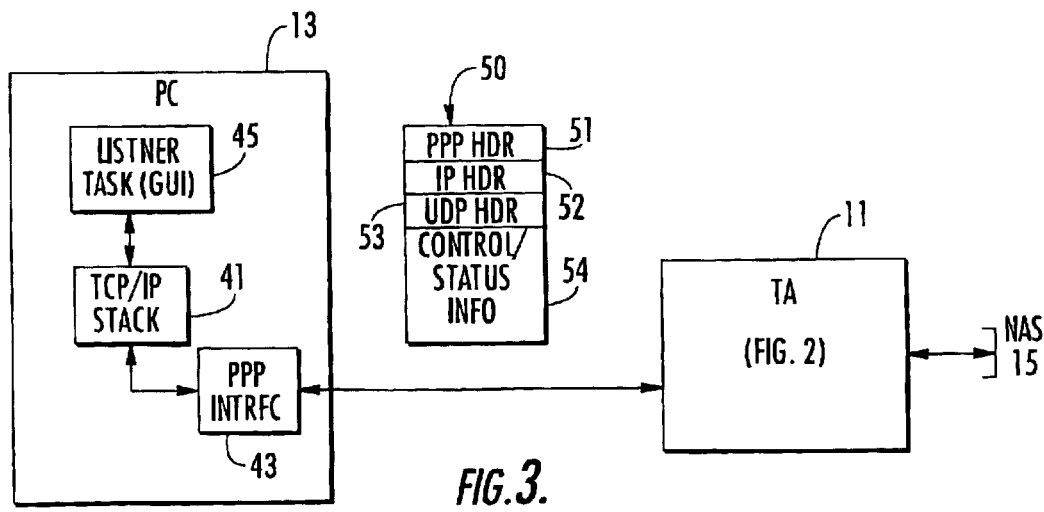
FIG. 3 diagrammatically illustrates functional components running on a personal computer in the course of UDP-based communications with the terminal adapter.
Figure 4:
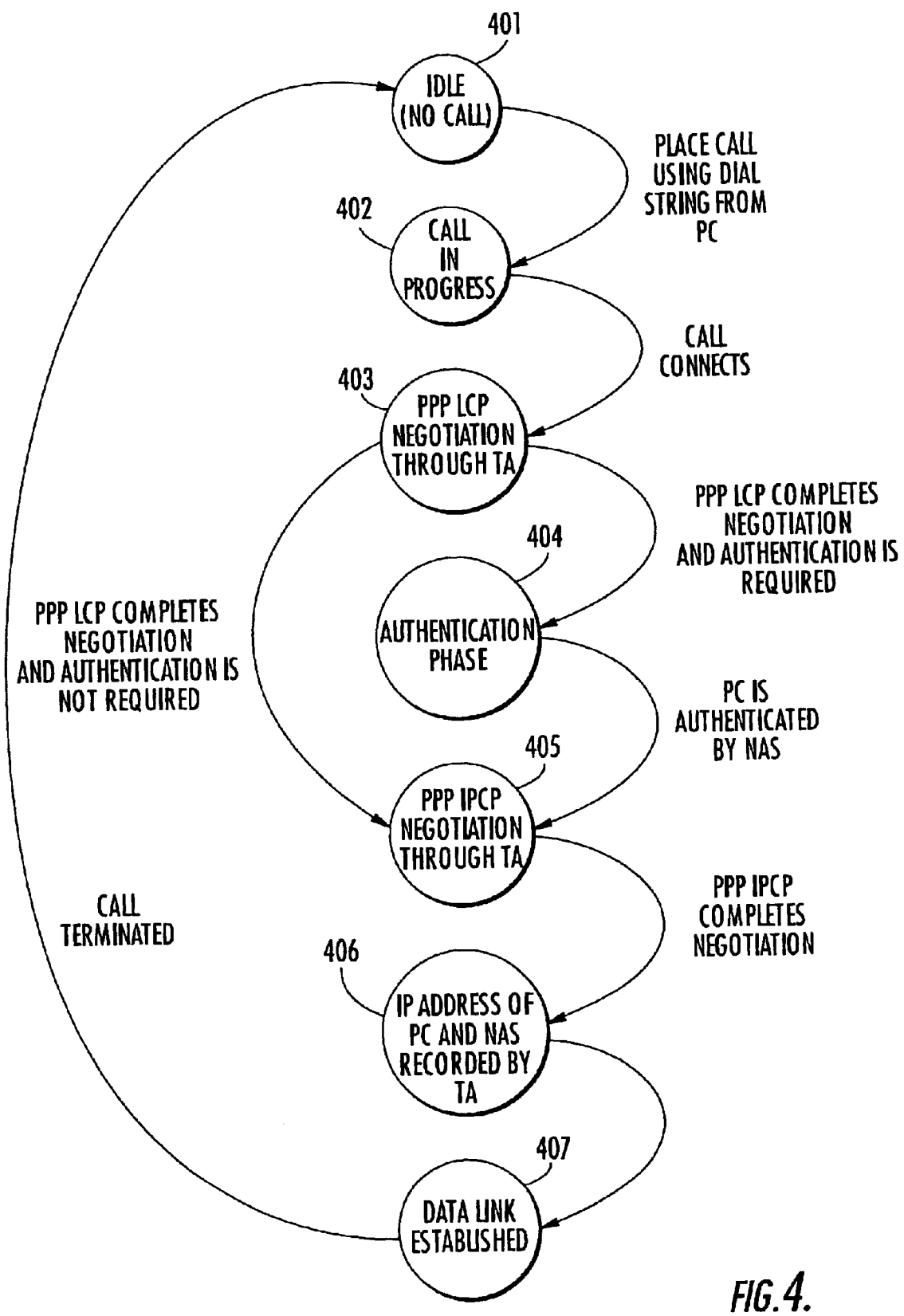
FIG. 4 is a state diagram of the establishment of a digital communication session data link between a DTE and a network access server.

Attention is now directed to block diagrams of FIGS. 2 and 3, and the state diagram of FIG. 4, which shows the sequence of events that are conducted to establish a digital communication session data link between the DTE and the network access server, and which are employed 1 by the present invention to enable the terminal adapter's communication controller to conduct UDP-based communications for conveying control/status information with the DTE. When the DTE (personal computer) 13 initiates a call by transmitting a sequence of digits to the (internet service provider's) network access server 15, it transitions from its idle state 401 (no call in progress) to a call-in-progress state 402.

In response to the call being answered at the network access server 15, the server initially proceeds to state 403, wherein it negotiates the link control protocol (LCP), as described above. If authentication is required, this operation proceeds through an authentication state 404 to the IP control protocol (IPCP) negotiation state 405. Otherwise (where authentication is not required), LCP negotiation proceeds directly to the IPCP negotiation state 405.

During the course of IPCP negotiation (states 403–405), the network access server 15 assigns the user's DTE 13 with an IP address for its TCP/IP stack 41, which interfaces its PPP interface 43 with listener task software (having an associated graphics user interface (GUI)) 45, and also informs the DTE 13 what its (the server's) IP address is. Since the PPP packets containing this peer IP address information are monitored by the PPP packet decoder 23, the communication controller is able to identify and store this IP address information (state 406). With peer IP addresses assigned, at state 407, an internet session data link between the DTE 13 and the network access server 15 is now established. When the call is terminated, the link returns to the idle state 401.

Figure 5:
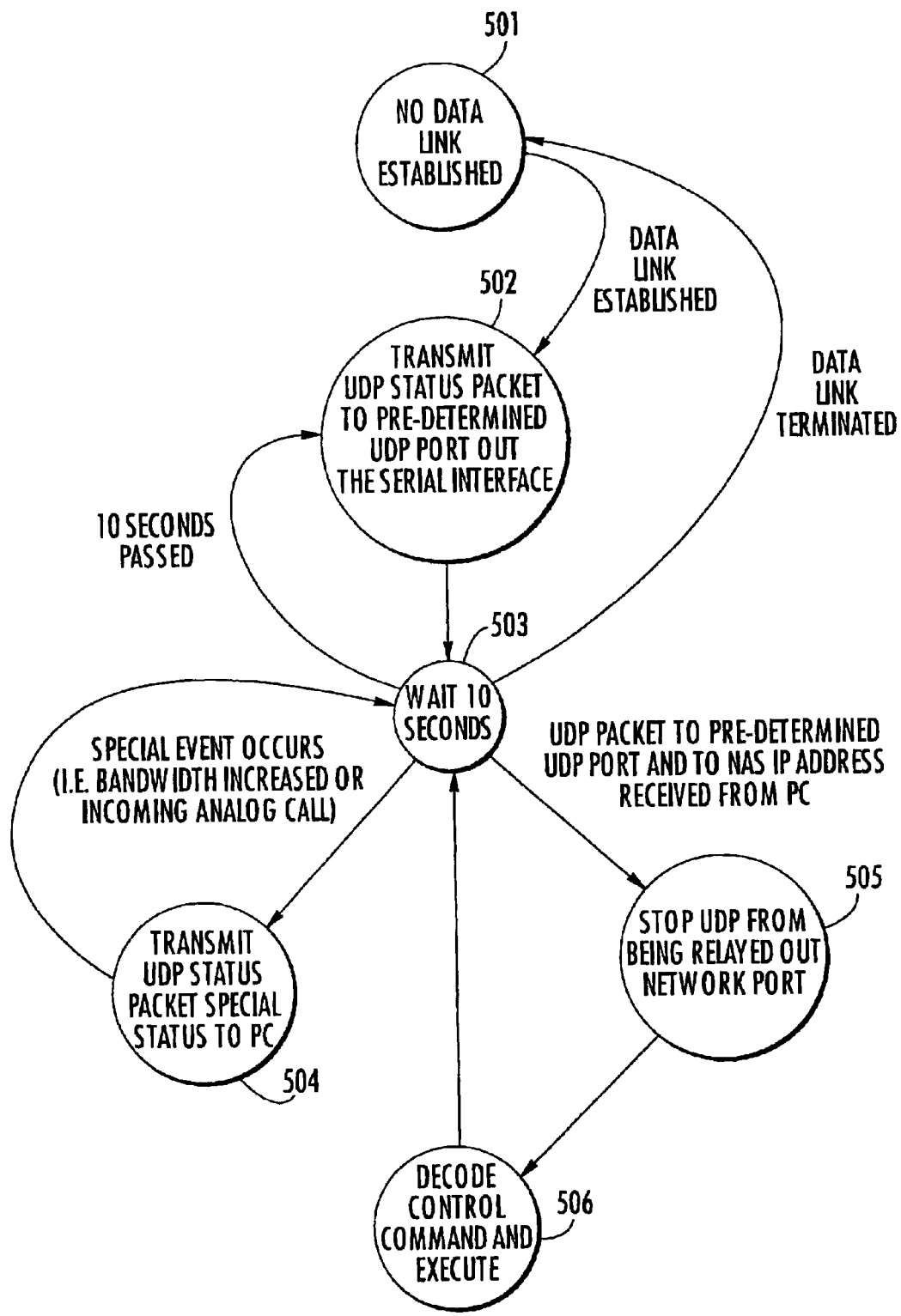
FIG. 5 is a state diagram associated with the operation of a terminal adapter's communication controller for UDP-based communications with the DTE during an active internet session.

As noted previously, once knowledge of each the DTE's and network access server's IP addresses has been acquired, the terminal adapter's communication controller 21 is able to conduct UDP-based communications with the DTE 13 during the active internet session, as shown in the state diagram of FIG. 5. At state 501, until the data link has been established in state 407 in the state diagram of FIG. 4, the initial state of the terminal adapter corresponds to no data link yet established. Once the state diagram of FIG. 4 transitions to state 407, the state diagram of FIG. 5 transitions to a corresponding data link established state 502.

In this state, the terminal adapter may proceed to transmit UDP-based messages to the DTE, by 'spoofing' the DTE's listener task software into thinking that such messages are associated with the network access server, when they are actually sourced from the terminal adapter's communication controller. In particular, in state 502, the terminal adapter's controller creates an IP packet stream 50 containing PPP header 51, IP header 52, UDP header 53 and control/status information fields 54. The UDP header 53 is employed as the transport mechanism for conveying status information.

The UDP destination (logical) port number may be any random port number, that is predetermined in accordance with the listener task software 45 being run by the DTE. In addition, the IP header 52 created by the terminal adapter contains a source IP address and a destination IP address. The source IP address is the IP address of the network access server and the destination IP address is the IP address of the DTE that were negotiated (and stored by the terminal adapter) during the data link establishment sequence of FIG. 4.

This DTE-destined UDP packet is then placed in the serial data path through the serial data interface 25 and conveyed out the terminal adapter's data port to the DTE 13. As mentioned earlier, and as will be described below with reference to the state diagram of FIG. 6, once the data link has been established, the DTE is running a listener task routine, which captures all UDP packets that are directed to the predetermined port number. The DTE's TCP/IP stack will pass the status information conveyed in the captured packets to the program.

In state 503, the terminal adapter's controller waits a prescribed period of time (e.g., ten seconds), before initiating a further operation. If a special event occurs, such as a change in bandwidth or an incoming analog call to another port, as non-limiting examples, a further status UDP packet is placed in the serial data path through the serial data interface 25 and conveyed out the terminal adapter's data port to the DTE 13 in state 504, and the routine loops back to state 503.

Where a message is sourced from the DTE and intended for the terminal adapter, it will also be assembled using UDP and directed to the predetermined UDP port and contain the network access server's IP address as the destination and the DTE's IP address as the source. As the packet from the DTE is interfaced through the serial data interface 25, buffered and decoded by the PPP decoder 23, the predetermined UDP port number will be detected, causing the message to be tagged as message intended for the terminal adapter, rather than the network access server. As pointed out previously, this will cause the controller 23 to disable the AND gate 29 and thereby prevent these packets from being forwarded via the network interface 31 to the network access server 15, as shown at state 505. The communication controller 21 then takes whatever action is contained in the command field of the received message, as shown at state 506. It then transitions back to wait state 503. If the packets contain a UDP port number other than the predetermined number, AND gate 29 is not disabled, and the packet is transmitted out through the network interface 31 to the network access server.

Figure 6:
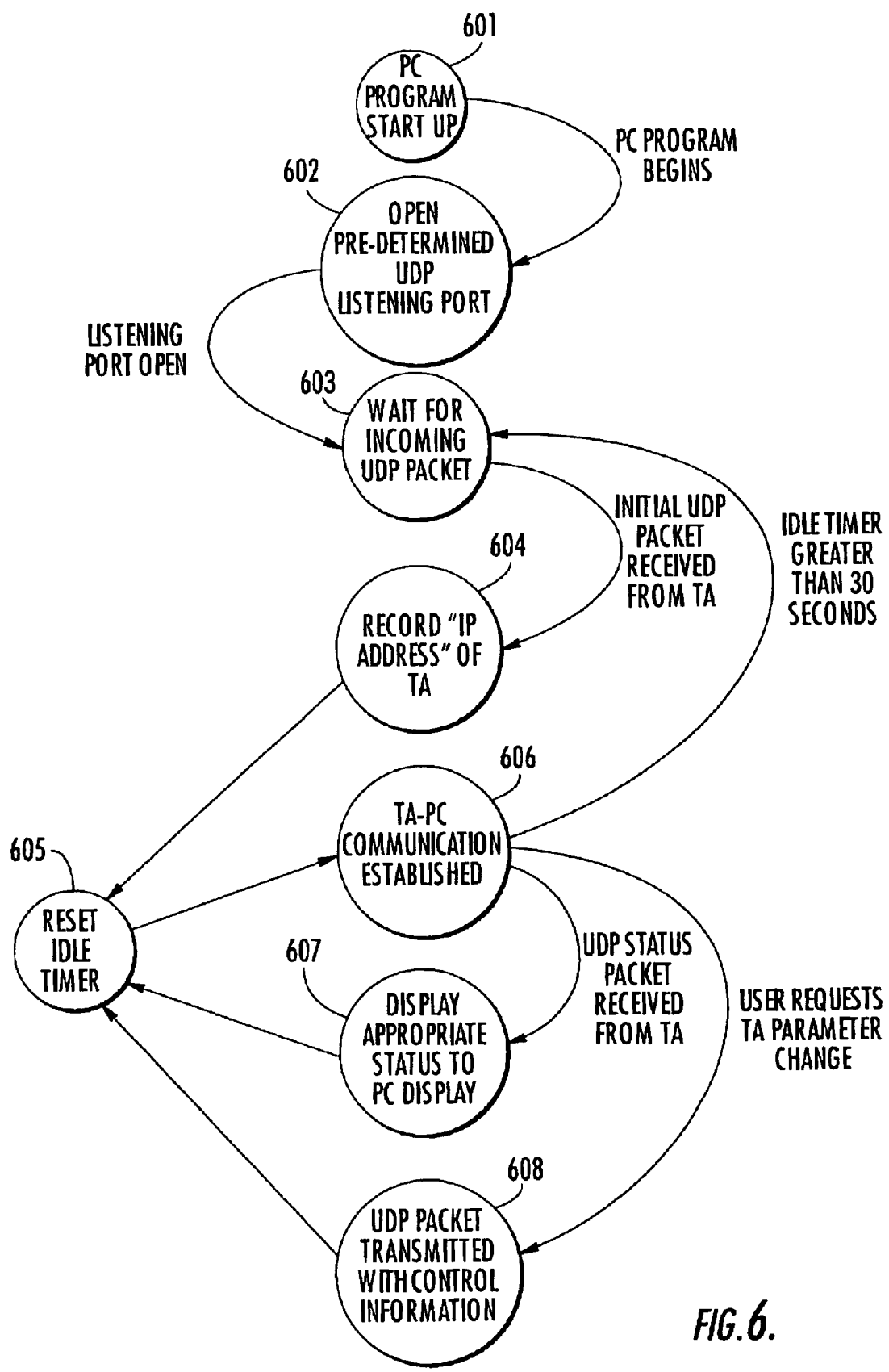
FIG. 6 is a state diagram associated with the operation of the DTE for UDP-based communications with the terminal adapter during an active internet session.

The state diagram of FIG. 6 shows the events associated with the operation of the DTE, once the data link has been established. At state 601, a PC program (usually a graphics user interface (GUI)) program is started, which allows an IP packet to be created using UDP as the transport for control information. In state 602 a predetermined UDP listening port is opened in the listening task software, and the routine transitions to step 603, wherein the DTE listening task software is waiting for an incoming UDP packet. When an initial UDP packet is received from the terminal adapter, that packet will contain the negotiated source IP address of the network access server, the negotiated destination IP address of the DTE, and the predetermined UDP address employed by the listener task routine.

In state 604, the IP address of the terminal adapter (represented by the combination of the negotiated source IP address of the network access server and the predetermined UDP address) is captured and stored, and an idle timer is reset in state 605. The DTE then transitions to state 606, associated with the terminal adapter-to-DTE communication having been established. If a UDP status packet is received from the terminal adapter, the DTE transitions to state 607, wherein status information contained in the incoming message is displayed (as by way of a pop-up window) on the GUI.

If the user sends a control message to the terminal adapter from the DTE, for example, initiates a change in an operational parameter of the terminal adapter, an associated UDP command packet is transmitted to the terminal adapter in state 608. As described above, this message will be tagged in the terminal adapter as a message intended for it, rather than the network access server, so that the controller 23 will disable the AND gate 29 and prevent the received packets from being forwarded via the network interface 31 to the network access server 15.

As will be appreciated from the foregoing description, the inability to conduct communications between a terminal adapter and a user's DTE (personal computer) during an active internet session is effectively obviated by means of the digital message monitoring mechanism of the present invention, which is readily installable in the terminal adapter's communications control processor. By monitoring the data link establishment communication exchange between the network access server and the personal computer, the invention is able to identify and capture IP addresses for each of the DTE and the network access interface. These IP addresses are then used by the terminal adapter to communicate in-band with the DTE using user datagram protocol (UDP)-based messages injected into the serial data path to the DTE.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of enabling a terminal adapter, through which a digital terminal device is coupled to a digital communication network interface that provides internet communication service to said digital terminal device, to conduct in-band communications with said digital terminal device during an internet communication session between said digital terminal device and said digital communication network interface, said method comprising the steps of:

(a) in the course of a data link establishment communication exchange between said digital communication network interface and said digital terminal device, identifying an internet protocol address of said digital terminal device and an internet protocol address of said digital communication network interface for said internet communication session, in accordance with digital communication signals passing through said terminal adapter between said digital communication network interface and said digital terminal device;

(b) in the course of said internet communication session between said digital terminal device and said digital communication network interface, generating in-band communication signals that contain internet protocol addresses identified in step (a); and (c) transmitting said in-band communication signals generated in step (b) in accordance with a prescribed digital data communication protocol, to a predetermined destination port employed by a communication control mechanism of said digital terminal device running said prescribed digital data communication protocol.

2. The method according to claim 1, wherein digital communication signals conveyed between said digital communication network interface and said digital terminal device employ point-to-point protocol.

3. The method according to claim 2, wherein said prescribed digital data communication protocol comprises user datagram protocol.

4. The method according to claim 1, wherein said terminal adapter is ported to at least one communication circuit exclusive of said digital terminal device and said digital communication network interface, and wherein said in-band communication signals generated in step (b) are representative of information associated with said at least one communication circuit.

5. A method according to claim 4, further including the step:

(d) receiving said in-band communication signals transmitted in step (c) at said digital terminal device, and generating an indication to a user of said digital terminal device of said information associated with said at least one communication circuit.

6. The method according to claim 1, further including the step:

(d) at said digital terminal device, in the course of said internet communication session between said digital terminal device and said digital communication network interface, generating and transmitting further in-band communication signals to said terminal adapter device that contain said internet protocol addresses identified in step (a) and which are effective to modify an operational parameter of said terminal adapter.

7. An arrangement for coupling a digital terminal device to a digital communication network interface that provides internet communication service to said digital terminal device comprising:

a first digital communication port coupled to said digital terminal device;

a second digital communication port coupled to said digital communication network interface;

a digital communication signal analyzer, coupled with said first and second digital communication ports, and being operative to identify an internet protocol address of said digital terminal device and an internet protocol address of said digital communication network interface for said internet communication session, in accordance with digital communication signals passing between said digital communication network interface and said digital terminal device, in the course of a data link establishment communication exchange between said digital communication network interface and said digital terminal device; and a communications controller, which is operative, in the course of said internet communication session between said digital terminal device and said digital communication network interface, to generate and transmit in-band communication signals to said digital terminal device using internet protocol address information identified by said digital communication signal analyzer.

8. The arrangement according to claim 7, wherein said communications controller is operative to transmit said in-band communication signals using a prescribed digital data communication protocol, to a predetermined destination port employed by a communication control mechanism of said digital terminal device running said prescribed digital data communication protocol.

9. The arrangement according to claim 8, wherein digital communication signals conveyed between said digital communication network interface and said digital terminal device employ point-to-point protocol.

10. The arrangement according to claim 9, wherein said prescribed digital data communication protocol comprises user datagram protocol.

11. The arrangement according to claim 8, wherein said arrangement is ported to at least one communication circuit exclusive of said digital terminal device and said in-band communication signals are representative of information associated with said at least one communication circuit.

12. The arrangement according to claim 11, wherein said in-band communication signals are operative to cause said digital terminal device generate an indication to a user of said digital terminal device of said information associated with said at least one communication circuit.

13. The arrangement according to claim 8, wherein said communication controller is operative to capture further in-band communication signals transmitted from said digital terminal device.

14. A communication arrangement for enabling a terminal adapter to conduct digital communication with an associated digital terminal device during an active internet session between said digital terminal device and a network access server, said communication arrangement comprising:
   a digital communication signal analyzer, which is operative to identify and capture internet protocol addresses for each of said digital terminal device and said network access interface, in accordance with information contained within a data link establishment communication signal exchange carried out between the network access server and said digital terminal device; and
   a communication controller, which is operative to conduct digital communications with said digital terminal device, during said internet communication session between said digital terminal device and said digital communication network interface, using internet protocol address information identified by said digital communication signal analyzer.

15. The communication arrangement according to claim 14, wherein said communication controller is operative to conduct digital communications with said digital terminal device, using a prescribed digital data communication protocol, and a predetermined destination port employed by a communication control mechanism of said digital terminal device running said prescribed digital data communication protocol.

16. The communication arrangement according to claim 15, wherein digital communication signals conveyed between said digital communication network interface and said digital terminal device employ point-to-point protocol, and said prescribed digital data communication protocol comprises user datagram protocol.

17. The communication arrangement according to claim 15, wherein said terminal adapter is ported to at least one communication circuit exclusive of said digital terminal device and said digital communication signals are representative of information associated with said at least one communication circuit.

18. The communication arrangement according to claim 17, wherein said digital communication signals are operative to cause said digital terminal device generate an indication to a user of said digital terminal device of said information associated with said at least one communication circuit.

19. The communication arrangement according to claim 14, wherein said communication controller is operative to capture digital communication signals transmitted from said digital terminal device to said terminal adapter.

* * * * *